Feb. 24, 1959 H. MÜLLER 2,874,775
TRIMMING MACHINE FOR AUTOMATICALLY TRIMMING THE
THREE OPEN EDGES OF STAPLED BOOKLETS
Filed May 6, 1957

*INVENTOR*
HANS MÜLLER

United States Patent Office 2,874,775
Patented Feb. 24, 1959

2,874,775

TRIMMING MACHINE FOR AUTOMATICALLY TRIMMING THE THREE OPEN EDGES OF STAPLED BOOKLETS

Hans Müller, Zofingen, Aargau, Switzerland

Application May 6, 1957, Serial No. 657,386

Claims priority, application Switzerland May 9, 1956

3 Claims. (Cl. 164—48)

The present invention relates to a trimming machine for the automatic trimming of stapled booklets supplied to it singly, and has the main object of providing a machine automatically trimming such stapled booklets on all three open edges.

It is another object of the invention to secure the said stapled booklets from inadvertently slipping back from the positions in which they are to be trimmed.

With these and other objects in view I provide a trimming machine comprising in combination: a base, a trimming block in operation continually moved up-and-down relative to said base and having three knives, two trimming stations arranged one behind the other in the direction of movement of the stapled booklets relative to said trimming block, a transporting device moving the said stapled booklets to the said trimming stations at a follow-up frequency corresponding to the frequency of strokes of the said trimming block and carrying the said booklets away therefrom after the trimming operation, and aligning means having abutments in operation moving up-and-down at the frequency of strokes of the said trimming block and protruding into the path of the said stapled booklets any time before a trimming operation, immobilising the same at the said trimming stations, the upper and lower edges of one stapled booklet being trimmed by two of the said knives at one of the said trimming stations simultaneously with the forward edge of another stapled booklet being trimmed at the said other trimming station by the third one of the said knives.

Figure 1:
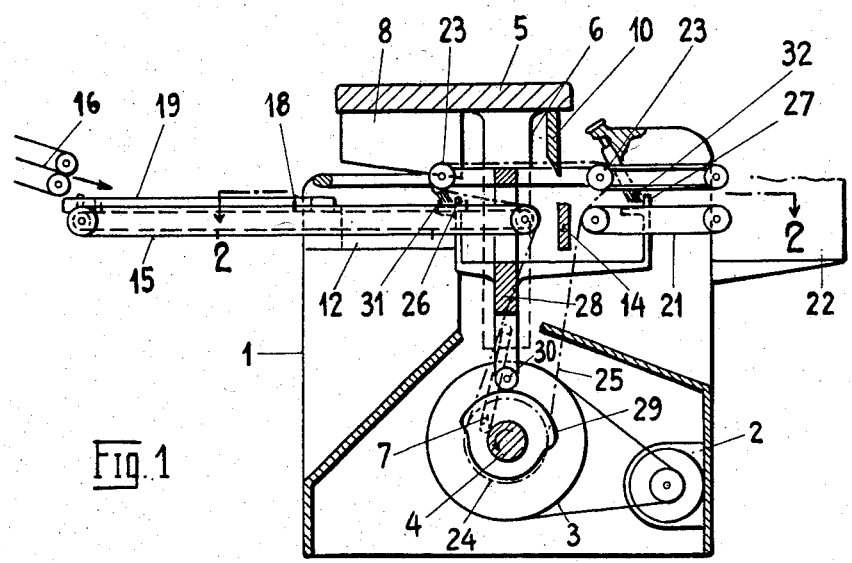
Figure 2:
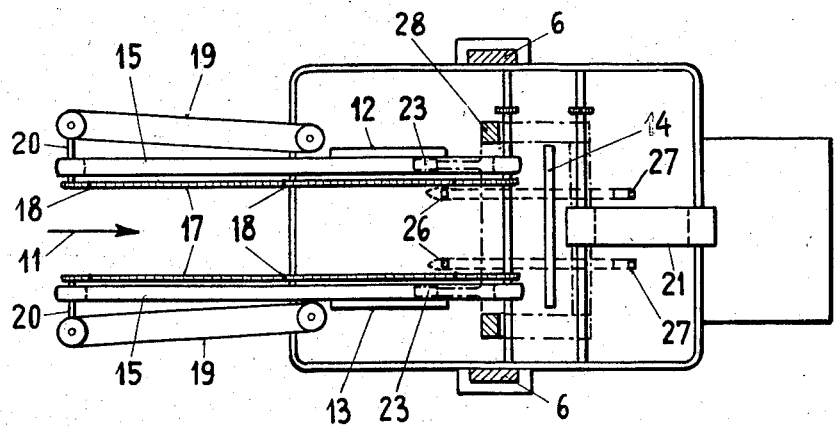

These and other objects and features of my said invention will be clearly understood from the following description of a preferred embodiment thereof given by way of example with reference to the accompanying drawing in which:

Fig. 1 is a longitudinal section of a trimming machine according to the invention, and Fig. 2 is a horizontal section on the line 2—2 of Fig. 1.

Referring now to the drawing a motor 2 is arranged in a base 1 of the trimming machine and drives a main shaft 4 through a belt drive 3 a trimming block 5 has two guide rails 6 by means of which it is mounted vertically moveably on the base 1 and which are connected by a crank drive 7 with the main shaft 4, so that a continual up and down movement is imparted to the trimming block 5 in operation. The trimming block 5 has three knives, which are distributed over two trimming stations disposed one behind the other in the direction of movement, indicated by arrow 11 of the stapled booklets.

At the first trimming station there are two knives 8 (of which only one is visible) which co-operate with the counter-blades 12 and 13 fixed to the base 1 and serve for trimming the upper and lower edges of the stapled booklets. The second trimming station where the front edges of the stapled booklets are trimmed is formed by a knife 10 co-operating with a stationary counter blade 14.

The conveyer device comprises two conveyer belts 15 passed around rollers with horizontal axes, which carry the stapled booklets singly to the trimming stations. The feeding of the conveyer belts 15 is effected either by an operative or by a machine (e. g., the preceding stapling machine) via the belt conveyer 16 indicated. Parallel to these conveyer belts 15 run two chains at a speed reduced as compared with the speed of the said belts, which chains are provided with abutment dogs 18. Owing to the higher speed of the conveyer belts 15 the stapled booklets are pushed against the abutment dogs 18 and well aligned. The rollers for the conveyer belts 15 and the sprocket wheels for the chains 17 are mounted side by side on the same shafts but have different diameters wherefrom results the difference in speeds. The speed of the chains 17 and the spacing of the abutment dogs 18 are chosen in such a manner that the stapled booklets are fed to the trimming stations at a follow-up frequency corresponding to the stroke frequency of the trimming block 5.

For the lateral aligning of the supplied stapled booklet moreover two directing belts 19 are arranged laterally of the conveyer belts 15 which are guided around rollers with vertical axes and converging wedge shape, the said directing belts being driven from shafts 20 each through a bevel gearing.

A further conveyer belt 21 running in the same direction carries the stapled booklets away from the trimming stations and deposits them in a pile 22. Moreover the conveyer device comprises pressure rollers 23 with horizontal axes and adjustable in the vertical direction, which are effective at the trimming stations and are intermittently pressed against the conveyer belts. The drive of all the components of the conveyer device is effected by a common driving belt 25 passed over the roller belonging to the various parts and a pulley 24 mounted on the main shaft 4.

For arresting the stapled booklets at the two trimming stations moveable abutments 26 and 27 are provided which protrude any time prior to the trimming operation into the path of the stapled booklets. These abutments are arranged together with the pressure rollers 23 on a common, vertically moveable beam 28 which is controlled by a cam 29 mounted on the main shaft 4, which cam acts on a roller 30 mounted on the lower end of the beam in such a manner that the abutments 26, 27 and the pressure rollers 23 are moved up and down at the stroke frequency of the trimming block 5.

In order that the stapled booklets arrived at the abutments 26, 27 are prevented from sliding back during the trimming operation, brushes 31 and 32, respectively, are arranged at the two trimming stations obliquely positioned and adjustable in height.

The manner of operation of the trimming machine described is as follows: a stapled booklet supplied by the belt conveyer 16 individually and with the back as the leading edge to the transport device is pushed by the conveyer belts 15 during the transport against a pair of abutment dogs 18 to the slower running 17 and are laterally aligned at the same time by the guiding belts 19. The entry of the stapled booklet takes place at the moment when the trimming block 5 assumes the upper dead centre position. The stapled booklet gets firstly to the first trimming position, i. e., under the brushes 31, up to the abutments 26 which at this moment protrude into their path, on which abutments they are arrested. The brushes 31 prevent the stapled booklet from sliding back. Then the trimming block 5 is lowered, the knives 8 trimming the upper and lower edges of the stapled booklet. After the trimming operation the trimming block 5 moves again up, and the beam 28 moves down, the abutments 26 sliding back from the path of the stapled booklet and the forward pressure rollers 23 pressing the stapled booklet against the conveyer belts 15 and taking care that the stapled booklet is moved parallel to itself to the second trimming station. The stapled booklet slides past the knife 10 up to the abutments 27. Before it reaches the abutments 27, the cam 29 controls the beam 28 and accordingly the abutments 27 to move upward, so that the stapled booklet is arrested there. The brushes 32 prevent here likewise the stapled booklet from sliding back. The trimming block 5 lowers itself again and effects in conjunction with the knife 10 the third cut, namely the trimming of the front edge of the stapled booklet. At the same time the upper and lower edge of the subsequent stapled booklet are trimmed by the knives 8 at the first trimming station, where it has arrived. After this second trimming operation the stapled booklet, trimmed at three sides, is pressed by the rear pressure roller 23, against the conveyer belt 21 and conveyed by the latter to the pile 22.

The trimming machine may be combined with any laying on device which can lay on finished stapled booklets, or with appliances which, e. g., previously staple the booklets. Mere care is to be taken for the synchronisation of the supply with the motion of the trimming block.

While I have described herein and illustrated in the accompanying drawing what may be considered a typical and particularly useful embodiment of my said invention I wish it to be understood that I do not limit myself to the particular details and dimensions described and illustrated, for obvious modifications will occur to a person skilled in the art.

What I claim as my invention and desire to secure by Letters Patent, is:

1. A trimming machine for automatically trimming the three open edges of stapled booklets comprising in combination: a base, a trimming block vertically reciprocable relative to said base and having three knives, two trimming stations arranged one behind the other in the direction of movement of the stapled booklets relative to said trimming block, a transporting device moving said stapled booklets to said trimming stations at a follow-up frequency corresponding to the frequency of strokes of said trimming block and carrying said booklets away therefrom after the trimming operation, aligning means having abutments operating synchronously to the strokes of said trimming block and protruding into the path of said stapled booklets before a trimming operation, immobilizing the same at said trimming stations, the upper- and lower-edges of one stapled booklet being trimmed by two of said knives at one of said trimming stations simultaneously with the forward edge of another stapled booklet being trimmed at said other trimming station by the third one of said knives, said transporting device comprising rollers and sprocket wheels having horizontal axes, endless conveyer belts passed around said rollers, endless chains passed around said sprocket wheels and having abutment dogs, said chains running in the same direction as and at a lower speed than said conveyer belts, rollers having horizontal axes and endless guide belts arranged laterally of said conveyer belts and passed around said last named rollers, said guide belts converging wedge-shape in the direction of movement of said booklets.

2. A trimming machine for automatically trimming the three open edges of stapled booklets comprising in combination: a base, a trimming block vertically reciprocable relative to said base and having three knives, two trimming stations arranged one behind the other in the direction of movement of the stapled booklets relative to said trimming block, a transporting device moving said stapled booklets to said trimming stations at a follow-up frequency corresponding to the frequency of strokes of said trimming block and carrying said booklets away therefrom after the trimming operation, aligning means having abutments operating synchronously to the strokes of said trimming block and protruding into the path of said stapled booklets before a trimming operation, immobilizing the same at said trimming stations, the upper- and lower-edges of one stapled booklet being trimmed by two of said knives at one of said trimming stations simultaneously with the forward edge of another stapled booklet being trimmed at said other trimming station by the third one of said knives, said transporting device comprising pressure rollers having horizontal axes adjustable in vertical direction at said trimming stations, endless conveyer belts and driving means pressing said pressure rollers against said stapled booklets and thereby pressing the latter on said conveyer belts during the intervals between consecutive trimming operations.

3. A trimming machine as claimed in claim 2 comprising a beam, a rotary cam journalled in said base and operatively engaging said beam, said pressure rollers and said movable abutments operative at said two trimming stations being mounted on said beam.

References Cited in the file of this patent

UNITED STATES PATENTS

| | | |
|---|---|---|
| 490,877 | Lovell et al. | Jan. 31, 1893 |
| 1,003,679 | Welch | Sept. 19, 1911 |
| 2,562,938 | Moyer | Aug. 7, 1951 |
| 2,562,950 | Roessl et al. | Aug. 7, 1951 |